United States Patent [19]

Ellsworth

[11] 4,436,108

[45] Mar. 13, 1984

[54] VALVE ASSEMBLY

[76] Inventor: Eugene W. Ellsworth, 1220 E. Alice St., Phoenix, Ariz. 85020

[21] Appl. No.: 198,853

[22] Filed: Oct. 20, 1980

[51] Int. Cl.³ .................................................. F16K 19/00
[52] U.S. Cl. ................................... 137/375; 137/312; 137/606; 137/869
[58] Field of Search ............... 137/312, 375, 606, 607, 137/869

[56] References Cited

U.S. PATENT DOCUMENTS

| | | | |
|---|---|---|---|
| 2,454,160 | 11/1948 | Greene | 137/375 |
| 3,045,696 | 7/1962 | Cobb | 137/607 |
| 3,167,091 | 1/1965 | Holdren | 137/606 X |
| 3,182,684 | 5/1965 | Hutchison | 137/606 |
| 3,443,578 | 5/1969 | Hedin | 137/606 X |
| 3,446,244 | 5/1969 | Beck | 137/606 |
| 3,924,651 | 12/1975 | Hippel | 137/606 X |
| 4,010,769 | 3/1977 | DeLorenzo | 137/312 |
| 4,161,187 | 7/1979 | Bauer | 137/375 |

FOREIGN PATENT DOCUMENTS 1224751  3/1971  United Kingdom ................ 137/375

*Primary Examiner*—Robert G. Nilson

[57] ABSTRACT

First and second passages extending through a housing communicate between first and second inlets, respectively, and a common outlet. Separately operable valve means selectively control the flow of fluid through each passage. A safety shut-off automatically closes the passage in response to failure of the actuating means for the respective valve means. The actuating mechanisms for the valve means are thermally insulated from the passages.

12 Claims, 6 Drawing Figures

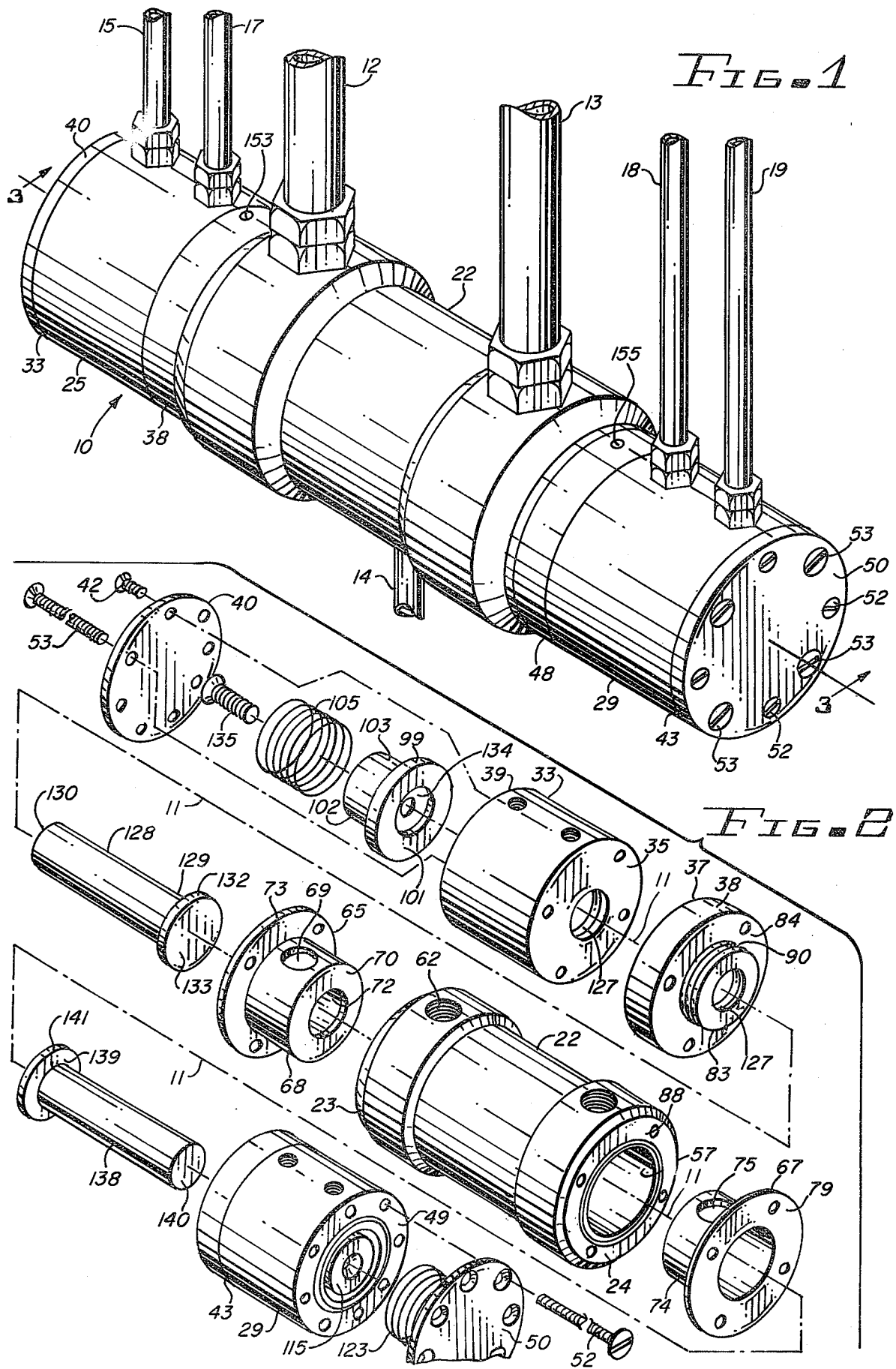

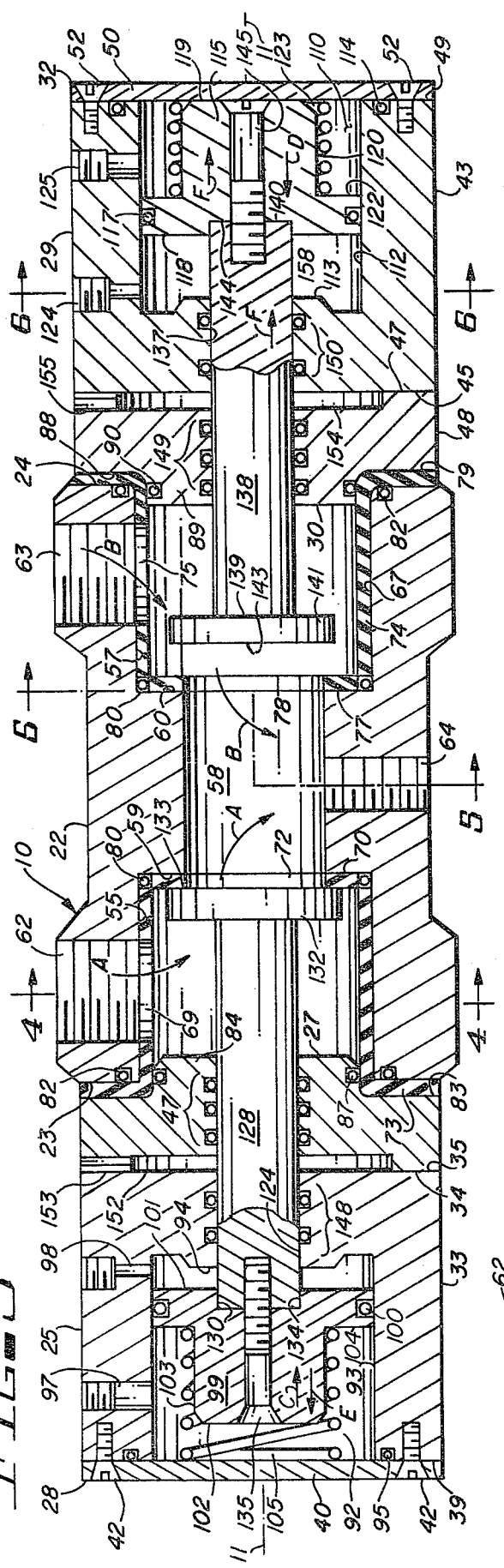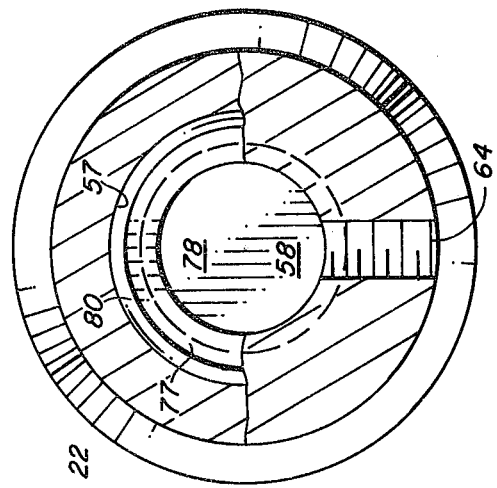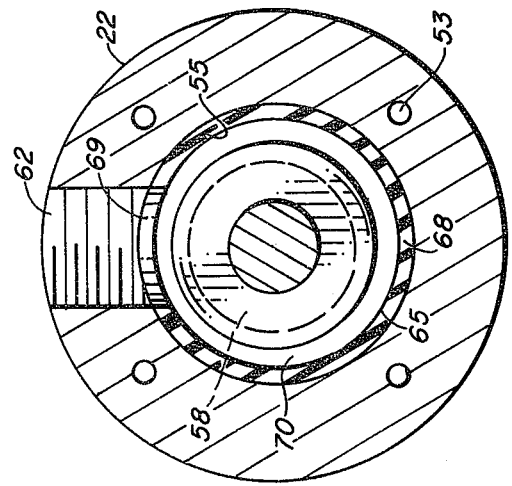

VALVE ASSEMBLY

FIELD OF THE INVENTION

This invention relates to fluid handling devices.

In a further aspect, the present invention relates to valve apparatus.

More particularly, the instant invention concerns a valve assembly especially adapted for the control of selective fluid flow.

PRIOR ART

Frequently, it is necessary to provide for the distribution of fluid within a system, such as, controlling the flow of fluid from separate sources to a single receiver, or from a single source to multiple receivers. The prior art is replete with devices for the immediate purpose. Such apparatus are available in numerous, specific design configurations as suggested by the various designations including duplex valve, proportioning valve, mixing valve and selector valve.

Generally, valves of the instant type have evolved to a high degree of sophistication. Exemplary is the valve commonly used in connection with commercially available washing machines. It is the function of the valve to receive hot water and cold water from normal line service and provide proportioned water to the washing vessel in accordance with the predetermined selection of the machine operator. In order to uniformly and repetitively supply the desired product, the valve is responsive to variations of temperature and pressure within the supply lines.

Contrarily, development of valves of the foregoing type for certain purposes has been noticeably neglected. The prior art has not, for example, provided an entirely satisfactory valve for the selective control of flow in certain environments and compatible with selected fluids, especially where elevated temperatures and pressures are concerned. For purposes of discussion, reference is made to the injection molding art.

During injection of the raw material, such as granular plastic, the mold is heated. Prior to ejection of the finished product, the mold is cooled. Heating and cooling are the result of circulating steam and water, respectively, through the passages surrounding the mold cavity. Those familiar with the art with readily appreciate the necessity for cyclic alternate heating and cooling of the mold.

Traditionally, the steam and the water are received from respective sources thereof by separate control valves. The output of the valves are joined into a common line leading to the mold. Typically, the valves are of the pneumatic actuated diaphragm type. The valves are joined to the common feeder line in accordance with standard plumbing procedures including iron pipe.

The foregoing arrangement is fraught with inherent deficiencies and limitations. The steam, typically ranging to 350° Fahrenheit and 120 pounds per square inch, is exceedingly deleterious to the valve, rapidly deteriorating the diaphragm and requiring frequent maintenance and repair. In addition to the immediate financial considerations associated with the repair of the valve, the mold is nonproductive during the time of repair. The assembly, including the valves and the inner connecting piping, represents a rather substantial mass which functions as a heat sink decreasing the efficiency of the apparatus by elevating the temperature of the cooling water and decreasing the temperature of the steam. The several connections or joints necessary to affect the assembly presents a potential for leaks. Further, the assembly is without safety features.

It would be highly advantageous therefore to remedy the foregoing and other deficiencies inherent in the prior art.

Accordingly, it is an object of the present invention to provide an improved valve assembly.

Another object of the invention is the provision of a valve assembly for the selective distribution of fluids.

And another object of the invention is to provide valve means for controlling the flow between separate sources and a common receiver.

Still another object of this invention is the provision of a valve assembly for handling normally erosive or deteriorative fluids.

Yet another object of the invention is to provide a valve especially adapted for controlling the flow of temperatures of fluids having elevated temperatures and pressures.

Yet still another object of the instant invention is the provision of a valve having safety shut-off means.

And a further object of the invention is to provide a valve which is positively actuated by a controlled pressurized fluid.

Still a further object of the instant invention is the provision of a valve in which the actuating components are thermally isolated from the fluid passages.

Yet a further object of the invention is to provide a valve especially adapted for handling fluids of extreme temperature differentials.

And still a further object of the instant invention is the provision of a valve of the above type which is relatively simple and unencumbered.

SUMMARY OF THE INVENTION

Briefly, to achieve the desired objects of the instant invention in accordance with a preferred embodiment thereof, first provided is a housing including first and second inlets for receiving first and second fluids, respectively, and an outlet for discharging a selected fluid. First passage means communicate between the first inlet and outlet while second passage means communicate between the second inlet and the outlet. First and second valve means, each being reciprocally movable between an open position and a closed position in response to a pressurized third fluid, control the flow of the fluid through the respective passages.

In accordance with a further embodiment of the invention, the first passage means includes a first inlet chamber for receiving the first fluid from the first inlet and an outlet chamber communicating between the first inlet chamber and the outlet. Second passage means includes an inlet chamber for receiving the second fluid from the second inlet and the outlet chamber. Each valve means includes a stem slidably disposed within the housing and carrying a gate member at one end thereof and cooperating with a valve seat within the respective passage. The other end of the stem resides within a chamber for receiving the pressurized fluid and controllably moving the stem.

In accordance with an even further embodiment of the invention, the housing includes an intermediate body portion and first and second end portions detachably securable to the respective ends of the intermediate body portion. The fluid passages reside within the intermediate body portion while the valve actuating means are carried within the respective end portions. A liner, of substantially greater corrosion resistance and hardness than the housing and carrying the valve seat, is detachably held within each inlet chamber. Further, the valve stem passes through an annular chamber forming a thermal insulating means between respective ends of the stem.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with drawings, in which:

FIG. 1 is a perspective view of the valve assembly of the instant invention as it would appear when coupled with the appropriate fluid lines;

FIG. 2 is an exploded perspective view of the device of FIG. 1;

FIG. 3 is an enlarged vertical sectional view taken along the line 3—3 of FIG. 1;

FIG. 4 is a vertical sectional view taken along the line 4—4 of FIG. 3;

FIG. 5 is an offset vertical sectional view taken along the line 5—5 of FIG. 3; and FIG. 6 is a vertical sectional view taken along the line 6—6 of FIG. 3.

DETAILED DESCRIPTION OF THE PREFERRED EMBODIMENTS

Turning now to the drawings in which like reference characters illustrate corresponding elements throughout the several views, attention is first directed to FIG. 1 which shows the valve assembly of the instant invention having a housing generally designed by the reference character 10 to which are secured a plurality of lines 12, 13, 14, 15, 17, 18 and 19. A first pressurized fluid, such as steam, is supplied to the valve assembly from a source thereof through first inlet line 12. A second pressurized fluid, such as water, is conducted from a source thereof to the valve through second inlet line 13. Fluids entering the valve assembly through inlet lines 12 and 13 are selectively discharged to a receiver, such as the passages within a mold assembly, through line 14. A third pressurized fluid, such as compressed air, passing through lines 15 and 17 actuates a first valve means within the valve assembly. Similarly, a second valve means is operated in response to pneumatic or hydraulic fluid received through lines 18 and 19. Further reference will be made throughout the ensuing description.

Referring now to FIGS. 2 and 3, it is seen that cylindrical housing 10 includes cylindrical intermediate body portion 22 having first cylindrical end 23 and second cylindrical end 24, and has a cylindrical axis 11. The intermediate body portion 22 and first and second end portions 23 and 24 are right circular cylinders whose cylindrical axes substantially coincide with axis 11 of housing 10.

First cylindrical end portion 25 having inner end 27 and outer end 28 and second cylindrical end portion 29 having inner end 30 and outer end 32. First end portion 25 includes outer section 33 having inner end 35 abutting outer end 37 of inner section 38 and outer end 39 to which is attached end cap 40 by screws 42. Analogously, second end portion 29 includes outer section 43 having inner end 45 adjacent outer end 47 of inner section 48 and outer end 49 having end cap 50 secured thereto by a plurality of screws 52. Housing 10 is removably held together by a plurality of screws 53 extending through appropriately sized apertures within the several components of each end portion 25 and 29 and threadedly engage the intermediate body portion 22. Accordingly, the elements within the housing 10, as will be described presently, are readily servicable.

Intermediate body portion 22, as further illustrated in FIGS. 4 and 5 and fabricated of various materials such as air pressure bronze, includes first cylindrical inlet chamber 55 formed inwardly from first end 23 and opposed second cylindrical inlet chamber 57. Cylindrical outlet chamber 58 communicates between inlet chambers 55 and 57. Inlet chambers 55 and 57, being larger in diameter than outlet chamber 58, terminate with first shoulder 59 and second shoulder 60, respectively. First inlet 62 and second inlet 63 extend radially through body portion 22 from first inlet chamber 55 and second inlet chamber 57, respectively. Similarly, outlet 64 communicates with outlet chamber 58.

Preferably, first inlet 62, second inlet 63, and outlet 64 are threaded for attachment of first inlet line 12, second inlet line 13 and outline line 14 in accordance with conventional procedure. First inlet 62, first inlet chamber 55, outlet chamber 58 and outlet 64 define a first passage, as designated by the arrowed lines A, for the flow of a pressurized first fluid between first inlet line 12 and outlet line 14. Analogously, second inlet 63, second inlet chamber 57, outlet chamber 58 and outlet 64 cooperate as a second passage for the flow of a pressurized second fluid between second inlet line 13 and outlet line 14 as shown by the arrowed lines B.

First generally cup-shaped liner 65 and second generally cup-shaped liner 67 reside within inlet chambers 55 and 57, respectively. First liner 65 includes generally cylindrical sidewall 68 having opening 69 aligned with inlet 62, inner end wall 70 abuting shoulder 59 and having opening 72 aligned with outlet chamber 58 and outwardly directed annular flange 73 bearing against first end 23 of body portion 22. Similarly, second liner 67 includes cylindrical sidewall 74 having opening 75 forming an extension of inlet 63, inner end wall 70 having opening 78 communicating with outlet chamber 58 and outwardly directed annular flange 79 abuting second end 24 of body portion 22. Preferably, liners 65 and 67 are fabricated of a material of greater hardness and exhibiting greater erosion resistance than the material of construction of intermediate body portion 22 in order to protect body portion 22 from the effects of potentially erosive or deleterious fluids, such as stainless steel. As will be later described in further detail, liner 65 and 67 further provide hardened valve seats for the respective valve means.

Liners 65 and 67 are sealed to intermediate body portion 22 by a first O-ring 80 proximate the respective end wall and a second O-ring 82 adjacent the respective flange. O-rings 80 and 82, along with other O-rings within the assembly as will be described presently, are utilized in accordance with pre-established standards for the use of such seals.

Liners 65 and 67 are held in place by cooperations between the intermediate body portion 22 and the respective end portions. A shoulder 83, spaced from inner end 27 and a cylindrical projection 84 extending therebetween, is carried by inner section 38 of first end portion 25. Cylindrical projection 84, carrying O-ring 87, is sealing received within the sidewall 68 of liner 65. The fit of projection 84 within liner 65 further provides means for locating end portion 25 relative intermediate body portion 22. Shoulder 83 abuts flange 73 opposing end 23 for compressive retention of flange 73 between intermediate body portion 22 and end portion 25. Analogously, cooperating shoulder 88, cylindrical projection 89 and O-ring 90 are carried by inner section 48 of second end portion 29.

A fluid receiving valve chamber, or cylinder, 92, having side wall 93 and terminating with inner end wall 94, is formed into outer section 33 of first end portion 25. Chamber 92 is closed and sealed by end cap 40 and O-ring 95. First and second ports 97 and 98 extend through section 33 and communicate with chamber 92. Preferably, the initial portion of first port 97 and second port 98 are threaded for attachment of lines 15 and 17, respectively. A valve piston 99 is slidably disposed within chamber 92 and sealed to sidewall 93 by O-ring 100. Piston 99 includes inner end 101, outer end 102 and reduced diameter portion 103 extending from outer end 102 and terminating with shoulder 104. A compression spring 105 encircling reduced diameter portion 103 and bearing against shoulder 104 and end cap 40, normally urges piston 99 in the direction of arrowed line C.

Similarly, a second cylindrical fluid receiving chamber, or cylinder, 110, having sidewall 112 and terminating with inner end wall 113, is formed inwardly from the outer end 49 of outer section 43 of second end portion 29. Chamber 110 is closed and sealed by end cap 50 and O-ring 114. Valve piston 115, slidably disposed within chamber 110 and sealed to sidewall 112, includes inner end 118, outer end 119, reduced diameter portion 120 and shoulder 122. Compression spring 123 bearing against shoulder 112 and end cap 50 normally urges piston 115 in the direction of arrowed line D. First port 124 and second port 125 communicate between lines 18 and 19, respectively, and chamber 110, as further viewed in FIG. 6.

Bore 127 extends through inner section 38 and outer section 33 of first end portion 25 between chambers 55 and 92. Valve stem 128, slidably disposed within the bore 127, terminates with first end 129 residing within chamber 55 and second end 130 residing within chamber 92. A gate 132, having an external diameter greater than outlet passage 58 and smaller than the diameter of sidewall 68, is carried by the first end 129 of stem 127. Valve gate 132 further includes a surface 133 matingly receivable against end wall 70 of liner 65. Second end 130 of stem 128 is received within recess 134 formed in inner end 101 of valve piston 99 and is secured thereto in accordance with conventional practice by screw 135 passing through piston 99 and threadedly engaging stem 128.

Second end portion 29, being a mirror image of first end portion 25, includes bore 137 extending through sections 43 and 48 and slidably carrying valve stem 138 having first end 139 and second end 140. Valve gate 141, analogous to previously described gate 132, carried at the first end 139 of stem 138, includes surface 143 receivable in seating engagement with end wall 77 of liner 74. Second end 140 of stem 138 is received within recess 144 and secured to valve piston 115 by screw 145.

Stem 128 is sealed within bore 127 by a first group of O-rings 147 carried by inner section 38 and a second group of O-rings 148 carried by outer section 33. Similarly, stem 138 is sealed within bore 137 by a first group of O-rings 149 held in inner section 48 and a second group of O-rings 150 held in outer section 43. A vent comprising annular chamber 152 encircling stem 128 and discharge port 153 are formed in inner section 38 intermediate O-ring groups 147 and 148. Annular chamber 154, encircling stem 138 and communicating with discharge port 155, formed in inner section 48, function as a vent intermediate O-ring groups 149 and 150.

Stem 128, gate 132, piston 99, chamber 92 and the immediately associated elements, comprise first valve means for selectively controlling the flow of a first fluid from line 12 through the first passage as indicated by the arrowed lines A. Similarly, stem 138, gate 141, piston 115, chamber 110 and the immediately associated components, provides a second valve means for selectively controlling the flow of a second fluid from line 13 through the second passage denoted by the arrowed lines B. Inner end wall 70 of liner 65 and inner end wall 77 of liner 67 function as replaceable valve seat inserts cooperating, respectively, with the first and the second valve means. For purposes of illustration, the first valve means is shown in the closed position while the second valve means is shown in the open position.

As will be readily appreciated by those skilled in the art, introduction of a pressurized third fluid, such as pneumatic or hydraulic fluid, into chamber 92 through port 97 urges stem 128 in the direction of arrowed line C closing gate 129 against the annular valve seat provided by end wall 70 which is symmetrical with respect to axis 11 and closing passage A. Conversely, the introduction of the pressurized third fluid through port 98 urges piston 99 in the direction of arrowed line E, unseating gate 129 from end wall 70 and opening passage A. Similarly, in response to a pressurized third fluid entering chamber 110 through port 125, gate 141 is urged against end wall 77 in the direction of arrowed line D closing fluid passage B. Alternately, pressurized fluid from line 18 passing through port 124 into chamber 158 moves piston 115 in a direction of arrowed line F displacing gate 141 from the annular valve seat provided by end wall 77 which is also symmetric with respect to axis 11 unclosing opening 78 and opening passage B for the flow of a second fluid between inlet 63 and outlet 64. It should be noted that the axes of valve chambers 92, 110, of valve pistons 99, 115, and of valve stems 128, 138 substantially coincide with axis 11, and that valve stems 128, 138 move in directions substantially parallel to axis 11.

Stop means are provided to limit the travel of the gates within the respective inlet chambers in a direction toward the inner ends of the respective end portions. It is seen, for example, that the distance between the outer end 102 of piston 99 and end cap 40 is less than the distance between gate 132 and surface 27. Accordingly, the abutment of end 102 against end cap 40 provides stop means to maintain a predetermined minimum distance between gate 132 and surface 27. Accordingly, in the open position, gate 129 is held in equilibrium by the pressure of the fluid moving through passage A. Were gate 129 to abut surface 27, pressure would be received only against surface 133 tending to hold the valve means in the open position and requiring greater pressure of the fluid entering through port 97. The identical feature is illustrated in connection with the second valve means.

The valve assembly of the instant invention includes several safety features. In response to failure associated with the pressurized third fluid, springs 105 and 123 function as safety shut-off means insuring immediate closing of the respective fluid passages. It is intended that the valve assembly of the instant invention accommodate dissimilar first and second fluids controllably moving through passages A and B, respectively. It is further intended that at least one of these fluids be of the type normally considered erosive or deleterious to normal valves. Exemplary is high pressure, high temperature steam. The liner protects the housing and provides a durable valve seat in the presence of such fluids.

High pressure fluids will tend to travel between the valve stem and the bore in which it is slidably disposed. Considering the first valve means for purposes of explanation, it is seen that the first group of O-rings 147 function as seal means to retain the pressurized fluid within passage A and prevent the transfer of such fluids from chamber 155 into chamber 92. In the event that the seal means provided by O-rings 147 fails, the high pressure fluid will enter annular chamber 152 and be vented through discharge port 153. The discharge of fluid from port 153 will present an immediate visual indication of failure to the operator of the system in which the valve assembly is included. It is further anticipated that other types of sensible alarm devices may be associated with the device of the instant invention and caused to be activated in response to the escape of pressurized fluid through port 153. O-rings 148 function as seal means to retain the pressurized third fluid within chamber 92.

The flow of high temperature fluid through passage A is potentially deleterious to the pressurized third fluid within chamber 92 and the proper functioning of the valve means. The transfer of heat, especially when a pneumatic fluid is utilized to operate piston 99, could result in an increase of the pressure of the actuating fluid beyond design pressures. Annular chamber 152 functions as thermal insulating means reducing the surface contact between surfaces 35 and 37 and providing an insulating air space between inner section 38 and outer section 33 of end portion 25.

Various changes and modifications to the embodiment herein chosen for purposes of illustration will readily occur to those skilled in the art. For example, ports 62 and 63 have been described as inlets while port 64 has been described as an outlet. It is contemplated that the valve assembly has utility for the selective distribution of a single fluid in which case the flow of the fluid is counter to the flow direction indicated. It is also contemplated that a plurality of openings may communicate with chamber 58 for diverse distribution of fluid or the attachment of various monitoring devices such as heat and temperature gauges. Similarly, more than one opening may be associated with the cavities 55 and 57. To the extent that such modifications and variations do not depart from the spirit of the invention, they are intended to be included within the scope thereof which is limited only by a fair assessment of the appended claims.

Having fully described and disclosed the present invention and the presently preferred embodiment thereof in such clear and concise terms as to enable those skilled in the art to understand and practice the same, the invention claimed is:

1. A valve assembly for receiving a pressurized first fluid and a pressurized second fluid and for controllably distributing a selected said fluid to a common receiver, said valve comprising:
   (a) a housing including an intermediate body portion having a first end having a first inlet chamber formed inwardly therefrom and a second end having a second inlet chamber formed inwardly therefrom, a first end portion detachably receivable to the first end of the intermediate body portion and a second end portion detachably securable to the second end of said intermediate portion,
      i. a first inlet for receiving said first fluid,
      ii. a second inlet for receiving said second fluid,
      iii. an outlet for discharging said selected fluid,
      iv. first passage means communicating between said first inlet and said outlet, said first passage means including the first inlet chamber for receiving said first fluid from said first inlet and an outlet chamber communicating between said first inlet chamber and said outlet, said first inlet chamber including detachable liner means,
      v. second passage means communicating between said second inlet and said outlet, said second passage means including the second inlet chamber for receiving said second fluid from said second inlet and said outlet chamber, said second inlet chamber including detachable liner means, said detachable liner means having substantially greater erosion resistance characteristics than said housing for protecting said chamber from erosive effects of said pressurized fluids, said liner means being clamped between the intermediate body portion and the respective end portions to retain the liners in their respective inlet chambers, said housing being separable for removal of said liner means,
   (b) first valve means reciprocally movable, in response to a pressurized third fluid, between an open position and a closed position for selectively controlling the flow of said first fluid through said first passage means; and
   (c) second valve means reciprocally movable, in response to said third fluid, between an open position and a closed position for selectively controlling the flow for said second fluid through said second passage means.

2. The valve assembly of claim 1, wherein each said liner means includes:
   (a) a generally cup-shaped section sized and shaped to be received within the respective said inlet chamber and having
      i. a first opening communicating with the respective inlet, and
      ii. a second opening communicating with said outlet chamber; and
   (b) an outwardly directed annular flange held in compression between the respective end of said intermediate body portion and the respective said end portion.

3. A valve assembly adapted to receive pressurized first, second and third fluids and for delivering selected amounts of said first or second fluids to a common receiver, said valve assembly comprising:
   a substantially cylindrical housing having cylindrical axis, said housing having an intermediate, a first end and a second end portion;
   means forming in the intermediate portion a central outlet chamber, a first inlet chamber and a second inlet chamber with a first inlet valve seat between the first inlet chamber and the outlet chamber and a second inlet valve seat between the second inlet chamber and the outlet chamber, said chambers being substantially cylindrical with their respective axes substantially coinciding with the cylindrical axis of the housing, said valve seats being substantially symmetric with respect to the cylindrical axis of said housing;

first inlet means in communication with said first fluid chamber and adapted to receive said first fluid;

second inlet means in communication with said second fluid chamber and adapted to receive said second fluid;

outlet means in communication with said outlet chamber and adapted to discharge fluid from the outlet chamber;

first valve means mounted in the first end portion including means forming a first valve cylinder in said first end portion, a first valve piston reciprocably movable in said first valve cylinder, a first cylindrical valve stem having two ends, one end being secured to said piston, said stem extending into said first inlet chamber, a valve gate on the other end of the valve stem and adapted to contact the first inlet valve seat when the first valve piston is in one position, means adapted to admit the third pressurized fluid into said first valve cylinder to selectively control the flow of said first fluid from said first inlet chamber into said outlet chamber; and second valve means mounted in the second end portion including means forming a second valve cylinder in said second end portion, a second valve piston reciprocably movable in said second valve cylinder, a second cylindrical valve stem having two ends, one end being secured to the second piston, said second stem extending into said second inlet chamber, a second valve gate on the other end of the second valve stem and adapted to contact the second inlet valve seat when the second valve piston is in one position, means adapted to admit the third pressurized fluid into said second valve cylinder to selectively control the flow of said second fluid from said inlet chamber into said outlet chamber.

4. The valve assembly as defined in claim 3 in which the intermediate, first and second end portions of the housing are each substantially a right circular cylinder.

5. The valve assembly as defined in claim 4 in which the valve cylinders, the valve pistons, the valve stems and the valve gates of the first and second valve means are substantially right circular cylinders having axes which axes substantially coincide with the cylindrical axis of the housing.

6. The valve assembly as defined in claim 5 in which the first and second inlet chambers include liner means which are detachably secured within each of said chambers.

7. The valve assembly as defined in claim 5 in which the end portions of the housing are removably secured to said intermediate portion whereby said liner means are replaceable.

8. The valve assembly of claim 7 in which the liner means of the inlet chambers are made of a material resistant to the erosive effects of said first and second pressurized fluids.

9. The valve assembly of claim 8 in which the liner means of the inlet chambers form the inlet valve seats of the first and second inlet chamber.

10. The valve assembly of claim 9 in which said first and second valve means include spring means acting against the valve pistons to force the valve gates against the valve seats to prevent fluid from flowing into said outlet chambers in response to a loss of said pressurized third fluid.

11. The valve assembly of claim 10 in which thermal insulating means are positioned between the intermediate portion and the adjacent end portions of the housing.

12. The valve assembly of claim 11 in which the first pressurized fluid is steam, the second pressurized fluid is water and the third pressurized fluid is compressed air.

* * * * *